United States Patent [19]

Fundingsland

[11] Patent Number: 5,132,836
[45] Date of Patent: Jul. 21, 1992

[54] REFLECTING TELESCOPE INCLUDING A FLAT APERTURED MIRROR ROTATABLE ABOUT PERPENDICULAR AXES

[76] Inventor: John O. Fundingsland, 1126 N. Sheridan Ave., Colorado Springs, Colo. 80909

[21] Appl. No.: 731,113

[22] Filed: Jul. 15, 1991

[51] Int. Cl.$^5$ .................. G02B 23/06; G02B 17/06; G02B 7/198
[52] U.S. Cl. .................................. 359/364; 359/874
[58] Field of Search ............ 359/364, 365, 366, 858, 359/859, 863, 727, 730, 731, 429, 430, 874

[56] References Cited

U.S. PATENT DOCUMENTS

| | | | |
|---|---|---|---|
| 2,478,762 | 8/1949 | Johnson | 359/364 |
| 3,971,620 | 7/1976 | Everett | 359/430 |
| 4,101,195 | 7/1978 | Korsch | 359/366 |
| 4,278,320 | 7/1981 | Carreira | 359/429 |
| 4,444,474 | 4/1984 | Pasko | 359/354 |
| 4,490,026 | 12/1984 | Weber | 350/567 |
| 4,576,452 | 3/1986 | Abel et al. | 350/620 |
| 4,927,252 | 5/1990 | Burr | 350/503 |

Primary Examiner—Jon W. Henry

[57] ABSTRACT

A reflecting telescope optical system comprising an elongated rigid base member having front and aft ends, an optical eyepiece fixed to the base member at its aft end, an objective mirror mounted on the front end of the base member and facing the eyepiece, the optical center of said mirror being in alignment with the optical center line of the eyepiece, an optically flat mirror carried by the said base member positioned intermediate the eyepiece and the objective mirror, generally facing the objective mirror but angularly positioned with respect to the plane thereof, and having a central aperture whose axis is in alignment with the said optical center line.

4 Claims, 1 Drawing Sheet

REFLECTING TELESCOPE INCLUDING A FLAT APERTURED MIRROR ROTATABLE ABOUT PERPENDICULAR AXES

The present invention relates to optical systems and more specifically to an improvement in reflecting type telescopes. The invention disclosed herein is the subject of a Disclosure Document, filing No. 231817, entitled "Improved Telescope Design".

BACKGROUND OF THE INVENTION

One object of the invention is to provide better optical performance for reflector type telescopes by eliminating from the construction of the telescope any light diffracting obstructions between the incoming light rays and the eyepiece.

Another object of the present invention to provide an optical system for a telescope that can access objects anywhere in the sky while maintaining the eyepiece in a comfortable position.

A still further object of the invention is to provide a telescope with a simplified alignment procedure, a multi-purpose finder mirror, and convenient camera mounting for celestial photography.

SUMMARY OF THE INVENTION

The optical system of the present invention is comprised of an eyepiece, an objective mirror, an optically flat perforated mirror, and means for mounting the above with optical centers in line, the flat mirror mounted between the eyepiece and the objective mirror and facing the objective mirror but so mounted as to create an angle between the flat mirror and the plane of the objective mirror. Preferably, the flat perforated mirror is pivotally mounted so it can be pivoted around two axes of rotation about its optical center to vary the angle between the planes of the flat perforated mirror and the objective mirror.

DETAILED DESCRIPTION OF THE PREFERRED EMBODIMENT

Figure 1:
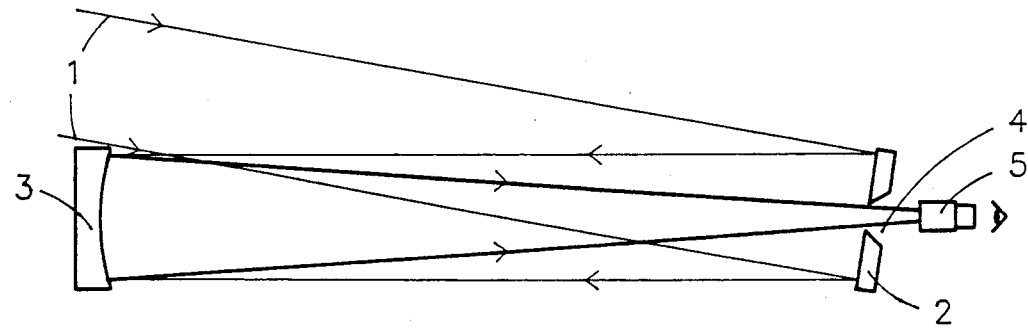
FIG. 1 is a diagrammatic view of the optical system of the present invention.

Referring now to the drawings for a more detailed explanation of a preferred form of the invention. FIG. 1 is a diagram illustrating the basic concept of the invention. The incoming light rays 1 strike the flat mirror 2, are reflected into objective mirror 3, then focused and reflected back through the flat mirror perforation 4, and to the eyepiece 5. The flat mirror is shown pivoted about 5 degrees from the general plane of the objective mirror. This drawing can be viewed as either a side view or top view of the optical system. This drawing clearly illustrates that the optical system of this invention completely eliminates any and all obstructions between incoming light rays and the eyepiece, thus providing a significant improvement in image resolution and a significant advance in the state of the art.

Figure 2:
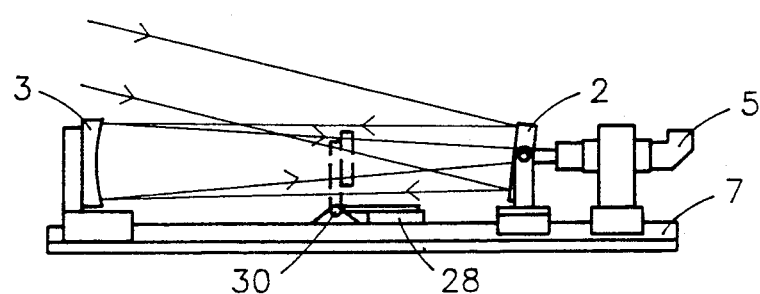
FIG. 2 is a diagrammatic view of the preferred structure of the telescope.

FIG. 2 illustrates the preferred telescope structure with eyepiece 5, flat perforated mirror 2, and objective mirror 3 mounted on a rigid bar 7 similar to an optical bench. The eyepiece and the parabolic objective mirror are standard optical parts and are readily available. The flat mirror is a standard precision optical flat modified with a center perforation large enough to allow focused light rays from the objective mirror to pass through to the eyepiece without obstruction. The telescope as shown in this drawing with the flat mirror pivot position fixed is the basic form of this new optical system. With this basic configuration, full benefit of the improved optical performance described above is realized. However, the telescope must be mounted on a conventional altazimuth or equatorial mount and the entire telescope rotated to select the objects to be viewed.

Fortunately, with this optical system, objects to be viewed can be selected in a different manner. If the flat perforated mirror 2 is mounted to pivot about two axes around its optical center, selective viewing of the entire hemisphere (except for the blind spot directly behind the objective mirror) is possible simply by pivoting the flat perforated mirror about its axes rather than rotating the entire telescope. Pivoting the mirror 45 degrees in any direction will obtain 90 degrees coverage in any direction because the angle of reflection is twice the angle of incidence. When used in this manner, the flat perforated mirror serves as a control mirror because it selects the objects to be viewed and directs their images into the objective mirror. This arrangement of pivoting the flat mirror to select objects for viewing eliminates the awkward viewing positions associated with conventional telescopes, thus offering a significant improvement in viewing comfort.

Figure 3:
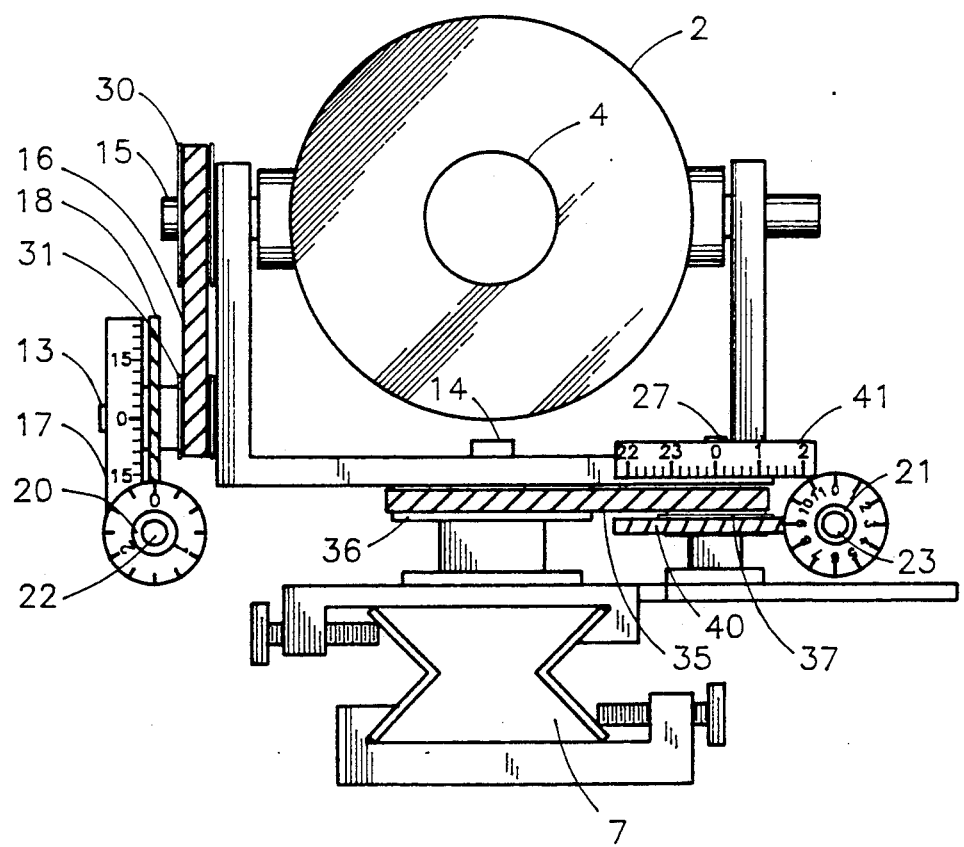
FIG. 3 is an enlarged rear view of the telescope with the eyepiece assembly removed, detailing the flat perforated mirror mounting and pivoting arrangement together with setting circles and slow motion control.

Referring to FIG. 3, the flat perforated mirror 2 is shown mounted for rotation about vertical and horizontal axes 14 and 15, both of which intersect the optical center of the flat mirror. The mirror may be rotated about its horizontal axis 15 by rotation of a toothed belt 16 which engages toothed pulleys 30 and 31, the former mounted on the horizontal axis 15 of the mirror 2. A worm 20 mounted on shaft 22, and an engaging worm gear 18, mounted on the spindle 13 of toothed pulley 31, provide a means for slow motion or slewing control of the mirror 2 during rotation about its horizontal axis. Setting circle 17 is also mounted on spindle 13. Shaft 22 can be either hand operated or power driven.

Similarly, the toothed belt 35 operatively interconnects toothed pulleys 36 and 37 to cause rotation of the mirror about its vertical axis 14. The toothed pulley 36 is rigidly fastened for rotation to a first spindle 14 which forms the mirrors vertical axis and a second spindle 27 serves to mount the toothed pulley 37. Also mounted on the spindle 27 is a setting circle 41 and a worm gear 40 which engages a rotatable worm 21 mounted on shaft 23. Shaft 23 can be either hand operated or power driven for slow motion and slewing control.

The toothed belt drives provide a 2-to-1 rotational ratio between the setting circles and the mirror pivot axes 15 and 14. This is required for the setting circle movement to correspond to the mirror reflected image movement.

Another significant feature of this telescope is the simplicity of alignment. Poor alignment can ruin the performance of the best optics. With this optical system, only two components require alignment with each other, the eyepiece and the objective mirror. It is assumed that the eyepiece assembly when mounted is properly aligned with the base. Only the objective mirror may require some adjustment to compensate for small differences in fabrication and assembly and properly direct the focused rays into the optical center of the eyepiece. A conventional piggyback finder scope can be used with the basic form of this telescope because the flat mirror 2 is mounted at a fixed angle with respect to the objective mirror, and the entire telescope must be rotated to select objects to be viewed. However, when using the flat mirror to select and view objects the usual piggyback finder scope is not compatible with this optical design. A very acceptable alternative is to insert an optional objective mirror 28 between the flat mirror and the main objective mirror, mounted pivotally on a spindle 30 so that it can be flipped up for finding and down for normal viewing. Preferably, the mirror is smaller in diameter and shorter in focal length than the main objective mirror.

An additional aid to finding can be provided by pointer bars attached to the setting circles. Sighting along these bars will give an approximation of the viewing area selected by the flat mirror.

The optional flip up mirror provides two more desireable features. The finder mirror can be of suitable diameter and focal length to serve as a richest field telescope for scanning the sky. It can also convert the telescope into a field microscope. By sliding the mirror to the far end (just in front of the main objective mirror) it is possible to focus objects as close as the end of the telescope.

The optical bench type of base presents a near perfect condition for photography. A special adjustable platform designed for mounting a camera can be clamped to the base either in place of the eyepiece assembly for prime focus photography or behind the eyepiece assembly for photography through the eyepiece and or a barlow lens.

I claim:

1. A reflecting telescope optical system comprising:
   optical eyepiece means having an optical center line,
   objective mirror means having an optical center line and facing the eyepiece means with the said optical center lines in alignment,
   an optically flat mirror having a central aperture and disposed intermediate the eyepiece means and the objective mirror means where the center of the aperture is coincident with the said optical center liens, and
   means pivotally mounting the said flat mirror for rotation about mutually perpendicular axes which pass through the center of the aperture whereby images reflected by the optically flat mirror will be directed to the objective mirror means.

2. The combination of claim 1 and further including a second objective mirror movably disposed intermediate the objective mirror means and the flat mirror and whose reflective surface generally faces the flat mirror to intercept and focus light rays reflected from the flat mirror.

3. The combination of claim 2 and further including means pivotally mounting the second objective mirror so that the second objective mirror may be selectively removed from the position of intercepting light rays from the flat mirror.

4. The combination of claim 3 where the second objective mirror is smaller in diameter and has a shorter focal length than the objective mirror means.

* * * * *